United States Patent [19]
Dettloff

[11] Patent Number: 5,361,542
[45] Date of Patent: Nov. 8, 1994

[54] DEFLATABLE SEAL

[75] Inventor: Gregory P. Dettloff, Ferndale, Mich.

[73] Assignee: Schlegel Corporation, Rochester, N.Y.

[21] Appl. No.: 896,444

[22] Filed: Jun. 10, 1992

[51] Int. Cl.$^5$ .......................... E06B 7/16; E06B 7/22
[52] U.S. Cl. .................................. 49/477.1; 49/498.1; 49/490.1
[58] Field of Search ................ 49/477.1, 490.1, 498.1, 49/495.1; 220/232; 277/27, 34

[56] References Cited

U.S. PATENT DOCUMENTS

| | | |
|---|---|---|
| 2,263,806 | 11/1941 | Hammerl ................ 49/498 |
| 2,469,131 | 5/1989 | Ross . |
| 2,720,011 | 10/1955 | Krupp ..................... 49/477 |
| 2,832,618 | 4/1958 | Knoll et al. .............. 49/477 |
| 2,969,252 | 1/1961 | Gruver ..................... 49/498 |
| 3,040,393 | 6/1962 | Dailey . |
| 3,042,980 | 7/1962 | Brinsmade . |
| 3,110,065 | 11/1963 | Dennis . |
| 3,159,884 | 7/1962 | Hankey . |
| 3,178,779 | 4/1965 | Clark et al. . |
| 3,359,687 | 12/1967 | Wallace .................. 49/477 |
| 3,438,150 | 4/1969 | Heim . |
| 3,491,484 | 1/1970 | Heim . |
| 3,747,275 | 7/1973 | May et al. . |
| 3,775,907 | 12/1973 | Weaver et al. ............ 49/498 X |
| 3,952,455 | 4/1976 | McAlarney ............... 49/498 X |
| 3,968,597 | 7/1976 | Hirtle . |
| 4,567,692 | 2/1986 | Vogt et al. . |
| 4,702,039 | 10/1987 | Bocchinfuso ............. 49/490 |
| 4,761,917 | 8/1988 | Knecht et al. . |
| 4,805,347 | 2/1989 | Smith . |
| 4,813,184 | 3/1989 | Weimar . |
| 4,924,629 | 5/1990 | Smith et al. . |
| 4,989,370 | 2/1991 | Smith . |
| 4,995,196 | 2/1991 | Smith . |
| 5,046,285 | 9/1991 | Fratini, Jr. et al. . |

FOREIGN PATENT DOCUMENTS

| | | |
|---|---|---|
| 2067637 | 7/1981 | United Kingdom . |
| 2123464 | 2/1984 | United Kingdom . |

Primary Examiner—Michael Milano
Attorney, Agent, or Firm—Cumpston & Shaw

[57] ABSTRACT

A deflatable weatherseal includes a deflatable chamber having a sealing surface for engaging a door or the like, and a relief chamber adjacent to the deflatable chamber for at least partially collapsing when pressure is applied to the sealing surface and the vacuum has not operated to collapse the seal.

20 Claims, 3 Drawing Sheets

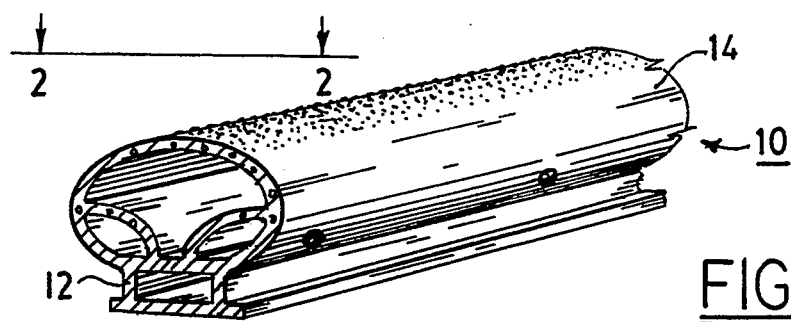
FIG. 1
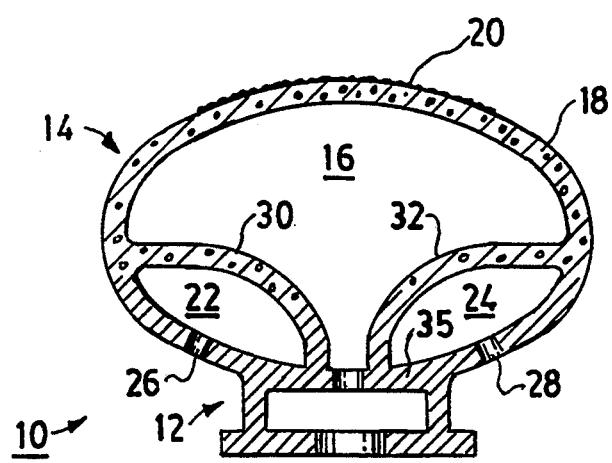
FIG. 2
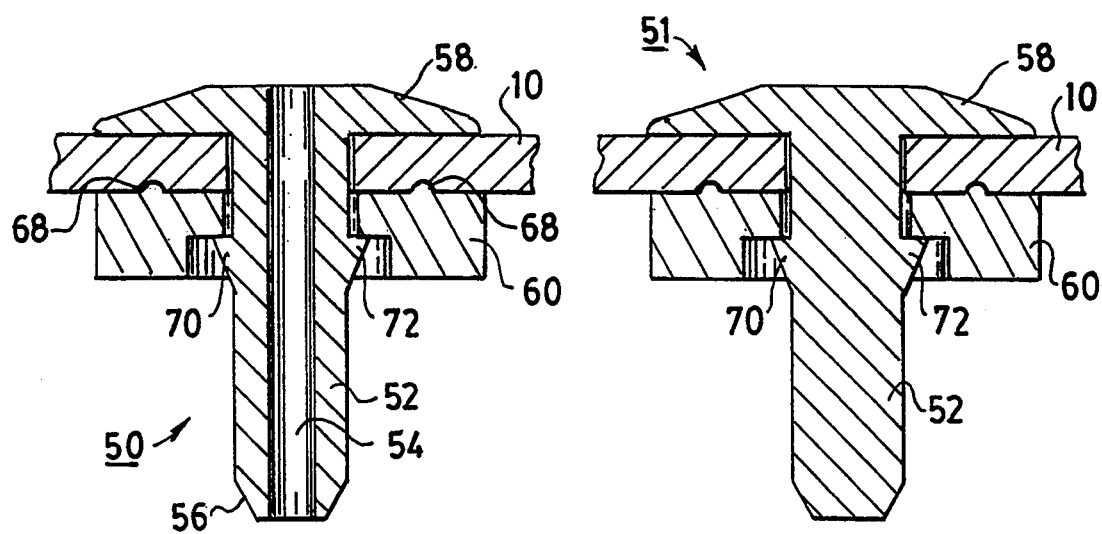
FIG. 3
FIG. 4

DEFLATABLE SEAL

This invention relates generally to weatherseals and more particularly for a deflatable weatherseal particularly useful for sealing door openings in motor vehicles.

The need to provide water and dust resistant seals for the doors of motor vehicles for example conflicts the desirability of providing seals that do not make the door hard to close. Both inflatable and deflatable seals have been proposed to address this problem.

Weimar Pat. No. 4,813,184 shows a deflatable seal having a tubular sealing part made of plastics or rubber of cellular or foamed configuration and lined with an air impervious material. Grooves are provided to control collapsing so that the collapsed seal has a neat appearance.

Clark et al. Pat. No. 3,178,779 shows an inflatable door seal having a double cell seal assembly with separate outer and inner cells and separate air pressure inlet and outlet ports for each cell to provide a fail safe feature.

Fratini, Jr. et al. Pat. No. 5,046,285 shows a deflatable seal system having a seal with a combination of thick and thin walls.

Known inflatable and deflatable seals have a number of shortcomings. It is desirable to provide a seal that collapses uniformly, that is to say one which collapses over its entire length rather than collapsing only at the point at which vacuum is applied. This is called vacuum pinch off.

It also desirable to provide a seal that collapses in a predetermined manner in an at least not unattractive profile. Since substantially the entire seal is visible when the door is open (and the seal is collapsed) it is important that the seal present an attractive appearance when collapsed.

It is desirable to provide a seal that simultaneously provides good sealing integrity and has a relatively small cross-sectional area so as to reduce the amount of vacuum required to collapse the seal. It is advantageous to maximize the external sealing surface area while minimizing the internal cross-section subject to vacuum.

Finally, it is an advantage to provide a reliable inexpensive connector for connecting the seal to a vacuum source.

Briefly stated, and in accordance with the presently preferred embodiment of this invention, a deflatable weatherseal includes a deflatable chamber having a sealing surface for engaging a door or the like, and a relief chamber adjacent to the deflatable chamber for at least partially collapsing when pressure is applied to the sealing surface and the vacuum has not operated to collapse the seal. In accordance with another aspect of this invention, the relief chamber includes a vent that may be open to the atmosphere for allowing the relief chamber to collapse. In accordance with another aspect of this invention, the deflatable chamber has supporting wall portions formed from a material characterized by a first relatively high durometer and a collapsible wall portion attached to the supporting walls, the collapsible wall portion formed from a material having a second lower durometer lower than the first durometer, or is more flexible than the first material.

In accordance with another aspect of this invention, the deflatable chamber and relief chamber share a common wall. In accordance with still another aspect of this invention the deflatable seal includes a mounting base to which the supporting walls are attached.

In accordance with a still further embodiment of this invention, the relief chamber includes a supporting wall portion formed from a relatively high durometer material and a collapsible wall portion formed from a relatively lower durometer material, the supporting wall portion being attached to the base and the collapsible wall portion being attached to the collapsible wall portion of the deflatable chamber.

In accordance with another aspect of this invention, a vacuum access mounting fitting is provided in the form of a pin having a bore extending therethrough, a stem for engaging a mounting member, on the vehicle and a head for engaging the mounting base of the deflatable seal. In accordance with another aspect of the invention, the vacuum access mounting fitting includes a shoulder for engaging the deflatable seal either directly or by way of an intermediate stress relieving washer.

The novel aspects of the invention are set forth with particularity in the appended claims. The invention itself together with further objects and advantages thereof may be more readily comprehended by reference to the following detailed description of a presently preferred embodiment of the invention taken in conjunction with the following drawings, in which:

FIG. 1 is a perspective view of an elongated deflatable seal in accordance with this invention;

FIG. 2 is an enlarged cross-section of the seal of FIG. 1;

FIG. 3 is a section of a mounting and vacuum access member in accordance with the invention;

FIG. 4 is a section of a mounting member in accordance with this invention;

Figure 5:
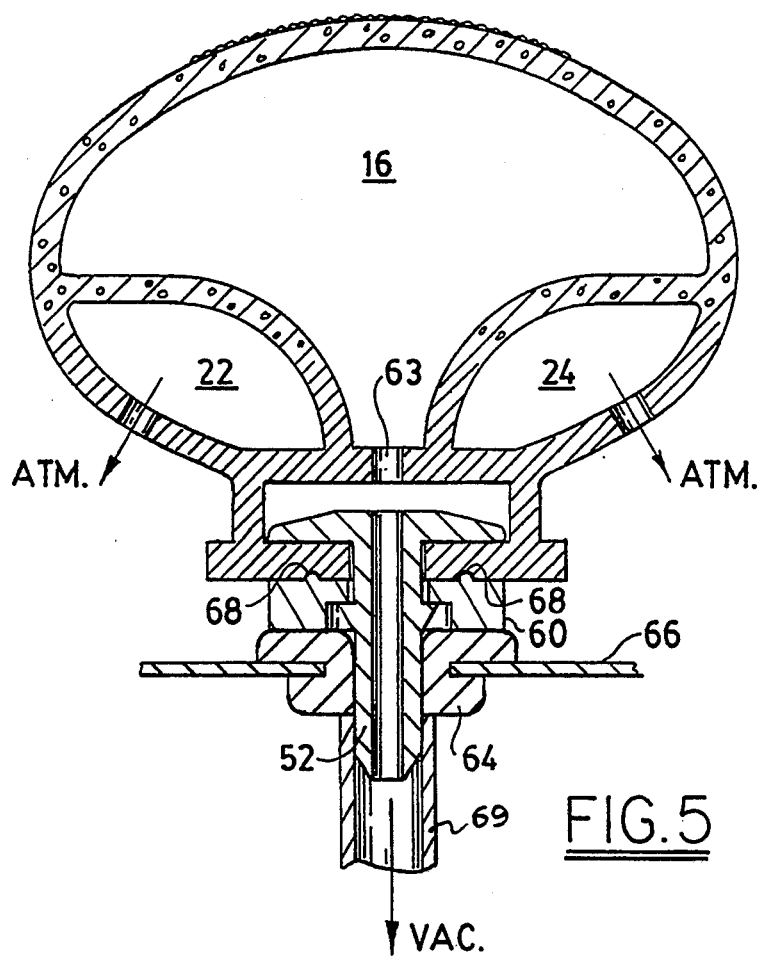
FIG. 5 is an enlarged sectional view of the deflatable weatherseal of this invention shown in combination with the mounting and vacuum access member, a grommet, an exemplary mounting flange, and a vacuum connection.

Referring now to FIG. 1, an elongated deflatable sealing strip 10 in accordance with the invention is illustrated. The strip 10 includes a generally rectangular mounting base 12 and a generally oval shaped hollow resilient sealing member 14 attached to an upper surface of the base.

As shown in FIG. 2, the sealing member 14 defines a deflatable interior chamber 16 having a collapsible wall 18 with a sealing surface 20 formed thereon. The sealing surface 20 is adapted to sealing engage a vehicle door, trunk lid or the like as it is closed in a direction generally perpendicular to the major dimension of the rectangular base 12. The sealing surface 20 may be provided with a suitable decorative finish such as flocking or the like to enhance its appearance.

The sealing strip 10 also includes a first relief chamber 22 and a second relief chamber 24. The relief chambers are vented to the environment through openings 26 and 28, respectively extending through the lower portions of the side walls of the weatherseal. The relief chambers are formed by interior walls 30 and 32 that extend from the upper surface 35 of the base 12 to about the midpoints of the side walls of the deflatable chamber 16.

The seal 10 is preferable formed from an elastomeric material by a continuous extrusion process. In accordance with a presently preferred embodiment of this invention, the seal is formed from EPDM rubber, a readily extrudible resilient material. Preferably, the base 12 and the lower portions of the outside wall 18 and interior walls 32 and 34 are formed from a dense EPDM rubber having a durometer between 30 and 70 preferably 67 or less. These portions of the weatherseal are relatively stiff. The more flexible upper portions of outside wall 18 and of the interior walls 32 and 34 are preferably formed from sponge EPDM rubber or the like having a durometer substantially less than the durometer of the base and lower wall portions. Preferably, these more flexible portions of the sealing strips are formed from sponge EPDM having a density (specific gravity) between 0.6 and 0.7, preferably 0.65.

The deflatable chamber 16 is preferably coupled to a selectively actuatable vacuum system within the vehicle through the fitting shown in FIG. 3 which also provides a means for mounting the sealing strip. The vacuum system per se is conventional and forms no part of the present invention. The fitting, indicated generally at 50, includes an elongated hollow shaft 52 having a central bore 54 and preferably a chamfered end 56. The end 56 is sized and shaped to receive the end of a conventional vacuum hose. The opposite end of the elongated shaft 52 terminates in an enlarged head 58 that is adapted to engage an inside surface of the base of the sealing strip 10.

Preferably, a backing washer 60 which may be a nylon washer is interposed between the base 10 of the sealing strip and a mounting grommet 64 (see FIG. 5) that secures the fitting in a hole in a metal flange 66. The nylon washer 60 is preferably provided with one or more blunt projections 68 for engaging the underside of the base 12 of the sealing strip 10 for preventing the washer 60 from rotating and preventing vacuum leaks. First and second resilient one-way, cam shaped projections 70 and 72 extend outwardly from the elongated hollow shaft 52 and engage the underside of washer 62 to hold it in engagement with the sealing strip. The grommet 64 is preferably a conventional rubber or plastic grommet or the like. A vacuum hose 69 is connected to the chamfered end of connector 50 and to a conventional vacuum source (not shown). The vacuum is communicated with the chamber 16 by opening 63 in the upper surface of the mounting base.

A mounting member 51 without a vacuum connection is shown in FIG. 4 for allowing multiple points of attachment.

Figure 6:
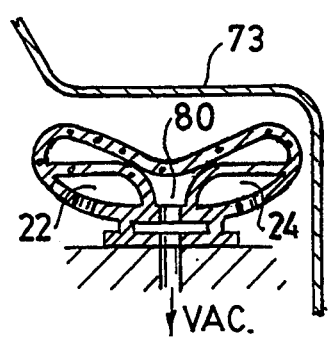
FIG. 6 is a section of the deflatable weatherseal of this invention showing the weatherseal collapsed by the application of vacuum.
Figure 7:
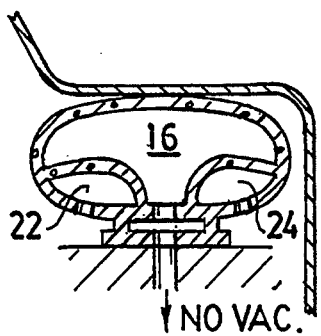
FIG. 7 is a section of a deflatable weatherseal in accordance with the invention showing the weatherseal in its normal sealing configuration;.
Figure 8:
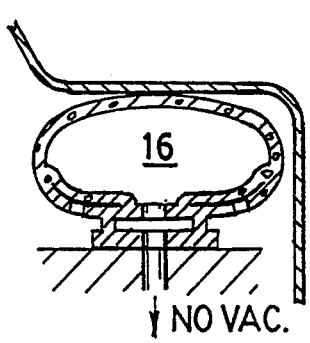
FIG. 8 is a section of the deflatable weatherseal of this invention in a compressed configuration as would occur when the sealed door or the like is closed with the vacuum disabled.

The operation of the deflatable sealing strip of this invention may be appreciated by referring now to FIGS. 6, 7, and 8. FIG. 6 shows the sealing strip in a deflated configuration. Normally, the elastic properties of the strip itself would maintain it in the configuration in FIG. 5. By drawing a vacuum within the deflatable chamber 16, the low durometer sealing portion 18 of the strip collapses in the manner shown by FIG. 6 to allow a door or other panel to be closed easily without interference from the sealing strip. Neither of the relief chambers collapses since no vacuum is created therein. Accordingly, the strip maintains an aesthetically pleasing shape even when deflated. Note that because the relief chambers 22 and 24 do not deflate the interior walls of the relief chambers support the collapsed wall of the deflatable chamber to maintain the desired appearance.

When deflated, as shown in FIG. 6, the sealing surface 20 is withdrawn to a position where it does not interfere with closing the door 73 which accordingly closes without resistance. Once the door has closed, the vacuum is released and the sealing surface returns, on account of its resiliency, to a position in sealing engagement with the door as shown in FIG. 7.

As shown in FIG. 8, in the event of failure of the vacuum system, the relief chambers 22, 24 allow the door to be closed without the high resistance that would normally be present. As shown in FIG. 8 where the deflatable chamber is not evacuated, and the door is closed, the relief chambers 22 and 24 collapse, preferably to nearly zero volume, to allow the door to be closed. This avoids the problem of undesirable high resistance of closing in the event of vacuum system failure.

Figure 9:
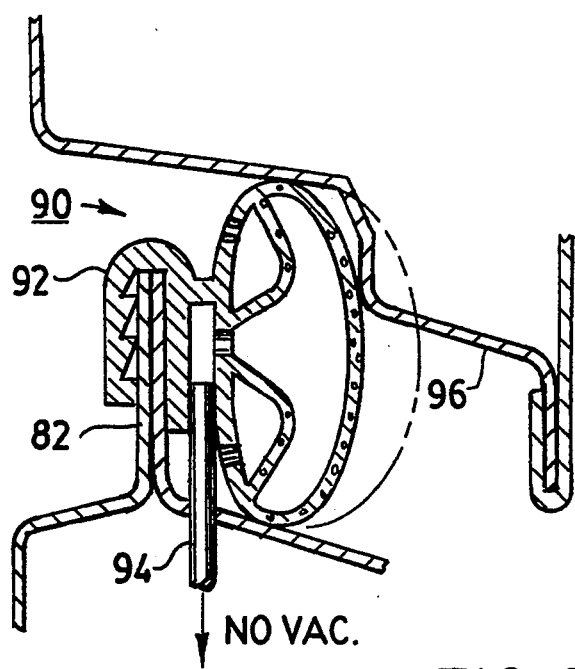
FIG. 9 shows an alternative embodiment of the weatherseal of this invention for mounting on the edge of a flange, and showing the weatherseal in a sealing configuration.
Figure 10:
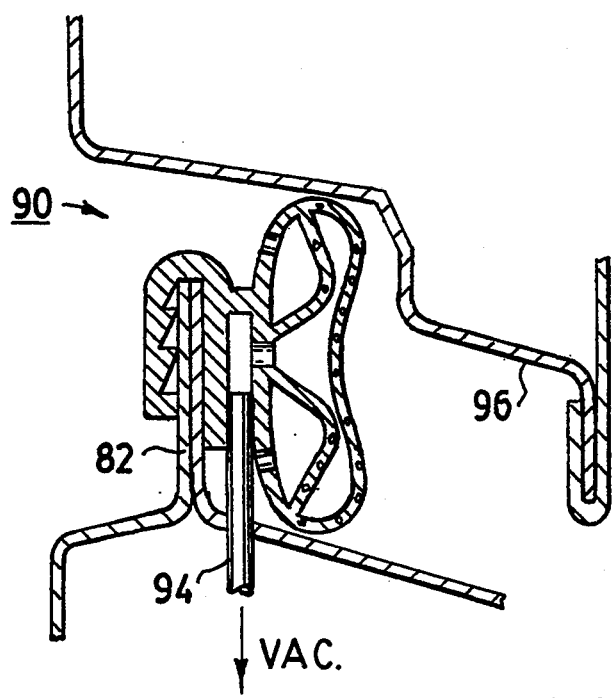
FIG. 10 shows the weatherseal of FIG. 9 in a deflated condition.

FIGS. 9 and 10 show an alternative embodiment of the deflatable sealing strip in accordance with this invention for mounting on the edge of a flange 82. The sealing strip 90 has an upper sealing portion that is substantially identical to that already described. The base differs in that a U-shaped attaching or gripping portion 92 is provided for installation on the edge of flange 82. The gripping portion may be an elastomer extruded over a conventional wire or metal carrier, as is very well known in the art. The vacuum connection in the deflatable sealing strip 90 is moved to the side of the rectangular portion of the base, where a rigid or flexible vacuum hose 94 may be inserted. FIG. 9 shows the sealing strip 90 in a sealing configuration, with the fully expanded configuration shown in phantom. FIG. 10 shows the sealing strip in a deflated configuration, illustrating the lack of interference with door panel 96.

The interior walls 30, 32 of the relief chambers 22, 24 in all versions of the sealing strip provide another function. As shown in FIG. 6, even in the collapsed state, the deflatable chamber has some volume. The interior walls of the relief chamber support the inside surface of the collapsed sealing portion of the deflatable chamber in a position above the base so that a channel 80 remains open along the entire length of the sealing strip. This prevents vacuum pinch off, that is local sealing of the vacuum opening, that prevents complete deflation of the deflatable chamber at one or more locations along the length thereof.

A further advantage of the sealing strip of this invention is that the relief chambers, which are not evacuated, occupy a substantial portion of the interior volume of the sealing strip. This reduces the volume of air that needs to be evacuated to collapse the strip and reduces the demands on the vacuum system. This causes the sealing strip to collapse more quickly or allows a smaller vacuum pump to be employed.

While the application has been described in connection with the presently preferred embodiment thereof, those skilled in the art will recognize that many modifications and changes may be made therein without departing from the true spirit and scope of the invention which accordingly is intended to be defined solely by the appended claims.

What is claimed:

1. A deflatable seal comprising:
   a deflatable chamber;
   a sealing surface on the deflatable chamber;
   an unpressurized relief chamber adjacent to the deflatable chamber in which the relief chamber comprises a vented chamber for at least partially collapsing when pressure is applied to the sealing surface.

2. The deflatable seal of claim 1 in which the relief chamber is within the deflatable chamber.

3. The deflatable seal of claim 1 in which the deflatable chamber and the relief chamber comprise a common wall separating the relief chamber from the deflatable chamber.

4. The deflatable seal of claim 3 in which the deflatable chamber comprises first supporting wall portion formed from a material characterized by a first stiffness, and a collapsible wall portion attached to the supporting wall portion and formed from a material having a second stiffness lower than the first stiffness.

5. The deflatable seal of claim 4 comprising a mounting base, in which the first supporting wall portion is attached to the mounting base.

6. The deflatable seal of claim 4 in which the material characterized by a first stiffness maintains its shape when the deflatable chamber is deflated and the material characterized by a second stiffness collapses when the deflatable chamber is deflated.

7. The deflatable seal of claim 5 in which a supporting wall portion of the relief chamber is attached to the mounting base and a collapsible wall portion of the relief chamber is attached to the collapsible wall of the deflatable chamber.

8. A deflatable seal comprising:
   a deflatable chamber comprising a first supporting wall portion formed from material characterized by a first stiffness and a collapsible wall portion attached to the supporting wall portion and formed from a material having a second stiffness lower than the first stiffness, the material characterized by the first stiffness maintaining its shape when the deflatable chamber is deflated and the material characterized by a second stiffness collapsing when the deflatable chamber is deflated:
   a sealing surface on the deflatable chamber; and
   an unpressurized relief chamber within the deflatable chamber and having a common wall with the deflatable chamber for at least partially collapsing when pressure is applied to the sealing surface.

9. A deflatable seal comprising a deflatable chamber having a first supporting wall portion formed from a first material and a collapsible wall portion formed from a second material, the collapsible wall portion being less stiff than the supporting wall portion:
   a sealing surface on the deflatable chamber:
   a relief chamber within the deflatable chamber and having a first supporting wall portion formed from a material characterized by a first stiffness and a second collapsible wall portion formed from material characterized by a second stiffness lower than the first stiffness, for partially collapsing when pressure is applied to the sealing surface.

10. A deflatable weatherseal for reducing the closing force needed to form a seal between a movable panel and the weatherseal comprising:
    a deflatable chamber having a sealing surface thereon;
    a relief chamber adapted to collapse if the deflatable chamber is pressurized by the application of an external mechanical force by the movable panel;
    vacuum means coupled to the deflatable seal for selectively reducing the volume of the deflatable chamber and moving the sealing surface away from the panel during closure and allowing the sealing surface to move towards the panel into a sealing relationship once closure is established.

11. The deflatable seal of claim 10 in which the relief chamber comprises a vented chamber.

12. The deflatable seal of claim 10 in which the deflatable chamber and the relief chamber comprise a common wall.

13. The deflatable seal of claim 12 in which the deflatable chamber comprises a first supporting wall portion characterized by a first stiffness and a collapsible wall portion, which portion includes a sealing surface, formed from a material having a lower stiffness than the first surface, so that upon application of a vacuum to the deflatable chamber, the collapsible wall portion collapses while the first supporting wall portion remains substantially undisturbed.

14. The deflatable seal of claim 13 comprising a mounting base, in which the first supporting wall portion is attached to the mounting base.

15. The deflatable seal of claim 13 in which the relief chamber is within the deflatable chamber.

16. The deflatable seal of claim 12 in which the deflatable chamber comprises first supporting wall portion formed from a material characterized by a first stiffness, and a collapsible wall portion attached ho the supporting wall portion and formed from a material having a second stiffness lower than the first stiffness.

17. The deflatable seal of claim 14 comprising a mounting base, in which the first supporting wall portion is attached to the mounting base.

18. The deflatable seal of claim 16 in which the relief chamber is within the deflatable chamber.

19. The deflatable seal of claim 16 in which the relief chamber comprises a first supporting wall portion formed from a material characterized by a first stiffness and a second collapsible wall portion formed from material characterized by a second stiffness lower than the first stiffness.

20. The deflatable seal of claim 19 in which the supporting wall portion of the relief chamber is attached to the mounting base and the collapsible wall portion of the relief chamber is attached to the collapsible wall of the deflatable chamber.

* * * * *